United States Patent [19]

Kosaka et al.

[11] 4,145,642

[45] Mar. 20, 1979

[54] SYSTEM FOR CONTROLLING THE ROTATION OF A DC MOTOR

[75] Inventors: Yoshiteru Kosaka, Kamakura; Seisuke Hiraguri, Yokohama, both of Japan

[73] Assignee: Victor Company of Japan, Ltd., Yokohama, Japan

[21] Appl. No.: 825,440

[22] Filed: Aug. 17, 1977

[51] Int. Cl.$^2$ .............................................. H02P 5/16
[52] U.S. Cl. .................................... 318/331; 318/318; 318/314
[58] Field of Search .......... 318/331, 345 CA, 345 AB, 318/318, 314, 6

[56] References Cited

U.S. PATENT DOCUMENTS

| | | | |
|---|---|---|---|
| 3,458,155 | 7/1969 | Planteijot | 318/6 |
| 3,781,620 | 12/1973 | Toth | 318/345 CA |
| 3,885,206 | 5/1975 | Hort | 318/318 |
| 3,965,405 | 6/1976 | Romano | 318/432 |

FOREIGN PATENT DOCUMENTS 2218235  10/1972  Fed. Rep. of Germany ........... 318/331

*Primary Examiner*—David Smith, Jr.

[57] ABSTRACT

A system for controlling the rotation of a direct current motor has an armature resistance control circuit. An operational amplifier has one input terminal connected to the direct current motor and another input terminal connected to form a differential amplifier. A first resistor is connected between an output terminal of the operational amplifier and one of the input terminals. A second resistor is connected between the other input terminal of the operational amplifier and a terminal for applying a control signal voltage thereto. A third resistor is connected between the output terminal of the operational amplifier and the other input terminal. The rotational phase of a structure rotated by the direct current motor produces a phase detection signal. A phase comparing means compares the phase detection signal with a reference signal and applies the resulting output, phase comparison error signal as a control signal voltage. The armature resistance and the first, second, and third resistors are connected as a bridge circuit.

8 Claims, 1 Drawing Figure

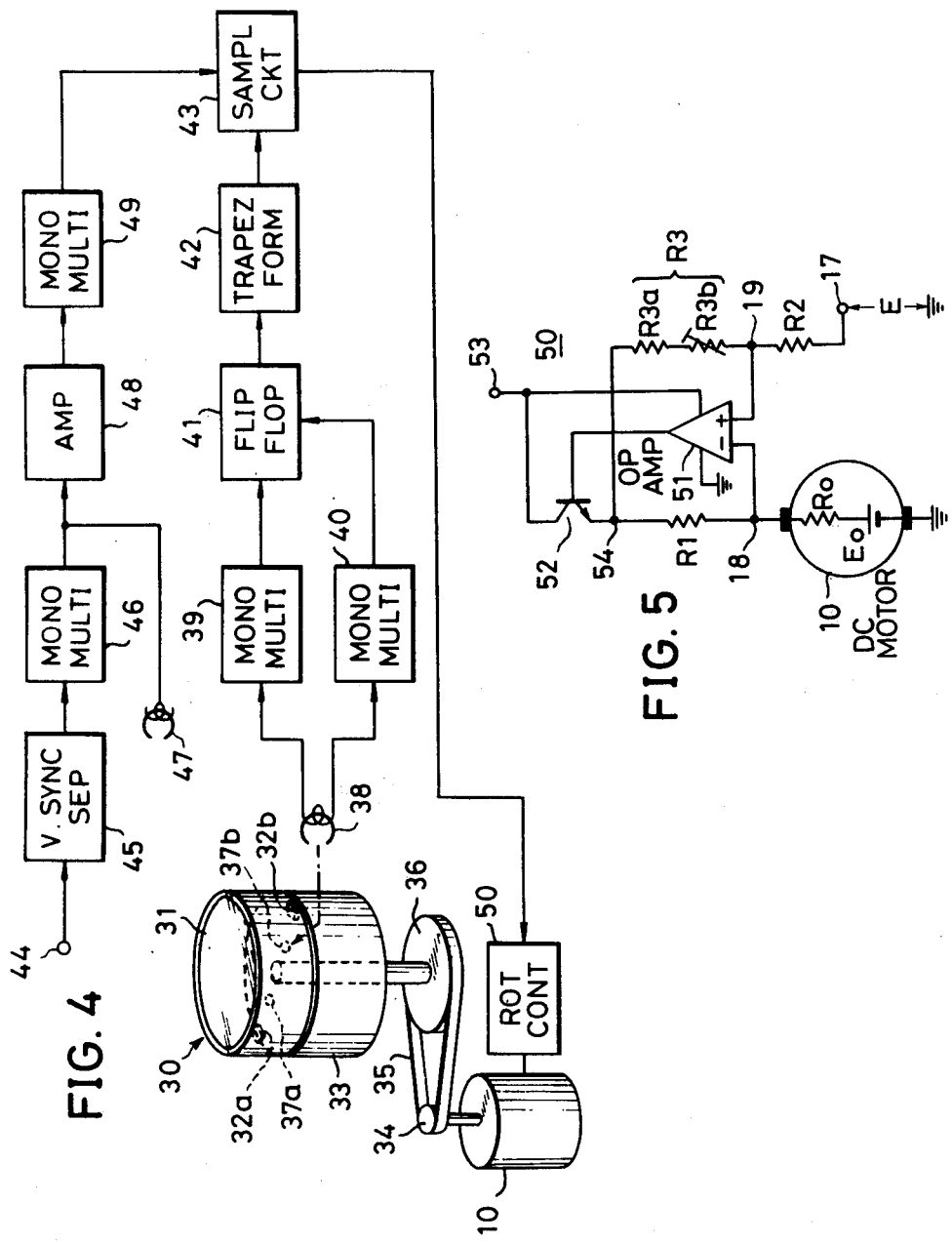

SYSTEM FOR CONTROLLING THE ROTATION OF A DC MOTOR

BACKGROUND OF THE INVENTION

The present invention relates generally to systems for controlling the rotation of direct current (DC) motors, and more particularly to systems using a simple circuit for controlling the rotational speed and rotational phase of a DC motor.

In one system known heretofore for controlling the rotational speed and rotational phase of a DC motor; first signal is derived responsive to the rotation of a structure driven by the DC motor. A phase error signal and a rotational speed error signal are obtained from this first signal and are used to control the DC motor.

This known system, however, has been accompanied by certain problems such as an unduly complicated circuit and high cost parts related to frequency detector circuits which have been required to obtain the rotational speed error signal.

SUMMARY OF THE INVENTION

Accordingly, it is a general object of the present invention to provide a novel and useful system for controlling the rotation of a DC motor, in which system the above described problems have been overcome.

Another object of the invention is to provide a simple and inexpensive circuit which is capable of controlling the rotational speed and the rotational phase of a DC motor.

Still another object of the invention is to provide a rotation control system for a DC motor, which system has electrical circuit means for detecting the rotational speed of the DC motor responsive to the counter electromotive force. The system compensates for the voltage drop across the armature resistance which occurs responsive to the armature current, so that the counter electromotive force remains constant. The rotational phase error of a driven structure rotated by the DC motor produces a resulting detection signal which functions as a speed reference signal for the above mentioned circuit means.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 4 is a block diagram of a DC motor rotation control system, constituting a first embodiment of the invention;

FIG. 5 is a circuit diagram of an essential part of the system shown in FIG. 4;

DETAILED DESCRIPTION

Figure 1:
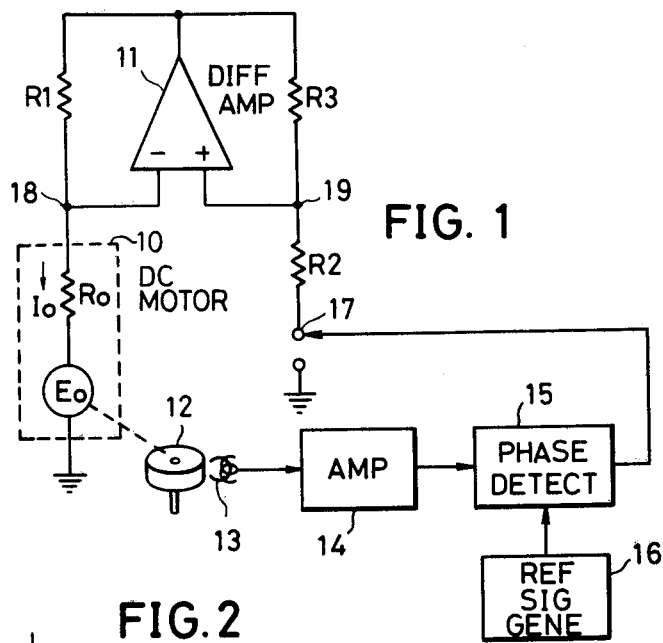
FIG. 1 is a basic circuit diagram, partly in block diagram form and partly in schematic form, of a DC motor rotation control system, according to the invention.

In FIG. 1, a DC motor 10 is connected, respectively, to the inverting input terminal of a differential amplifier 11 (constituting an operational amplifier) and through a resistor R1 to the output terminal of the differential amplifier 11. The noninverting terminal of the differential amplifier 11 is connected, respectively, through a resistor R2 to a terminal 17 and through a resistor R3 to the output terminal of the differential amplifier 11.

Here, the counter electromotive force Eo of the DC motor 10 is expressed by the following Eq.(1).

$$Eo = E - IoRo \qquad (1)$$

where:
Ro is the armature resistance of the DC motor;
Io is the armature current; and
E is the voltage applied to the DC motor.

The counter electromotive force Eo is proportional to the rotational speed of the motor. Furthermore, the armature current Io is proportional to the rotational torque of the motor. For this reason, when the torque becomes large, the voltage drop IoRo across the armature resistance Ro becomes large. As is apparent from the above Eq.(1), the counter electromotive force Eo drops, while the rotational speed also decreases. Accordingly, the torque versus rotational speed characteristic of the DC motor is as indicated by the line I in FIG. 2, when the driving voltage is constant. However, when the armature resistance Ro is low, the torque versus rotational speed characteristic becomes, as indicated by the line II. If resistance Ro is zero, voltage Eo is equal to E. The rotational speed becomes constant irrespective of the value of the torque, as indicated by the line III in FIG. 2.

When a constant voltage $E_1$ is applied to the terminal 17, in the circuit in FIG. 1, the rotational speed of the motor 10 decreases. The armature current I increases, and the voltage drop across the resistor $R_1$ becomes large. On the other hand, the current in the resistors R2 and R3 does not change. Therefore, in comparison with their states prior to a reduction of the rotational speed of the motor, the voltage at a junction 18 becomes lower than that at a junction 19. The output voltage of the differential amplifier 11 becomes high.

While the current in the resistor R1 and the motor 10 does not change, the current in the resistors R3 and R2 increases by an increment corresponding to the rise in the output voltage of the differential amplifier 11, since the voltage at a terminal 17 does not change. As a consequence, the voltage drop across the resistor R3 becomes large. The output voltage of the differential amplifier 11 increases until the voltage drop across the resistor R3 and that across the resistor R1 coincide. When these voltage drops across the resistors R1 and R2 coincide, the difference between the two input voltages of the differential amplifier 11 becomes zero. The output voltage of the differential amplifier 11 becomes constant at that instant. Consequently, the motor voltage and the voltage at the terminal 17 become equal, and the motor 10 continually rotates at a constant speed, in accordance with the voltage applied to the terminal 17.

Figure 2:
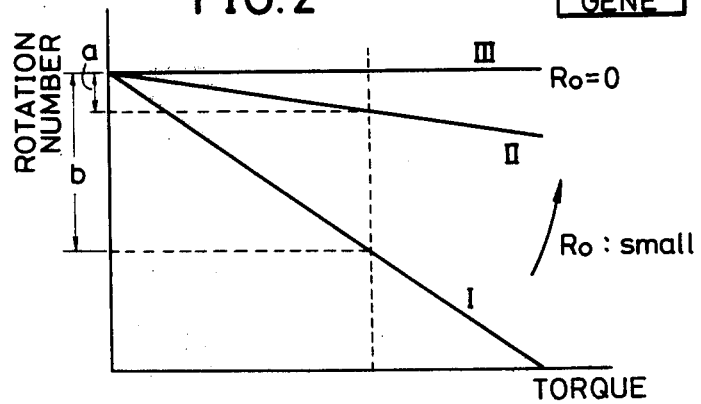
FIG. 2 is a graph indicating torque versus rotational speed characteristics of a DC motor.

Accordingly, with the circuit shown in FIG. 1, a characteristic by which the resistor Ro is cancelled by the resistors R1 and R2 is obtained as shown by the characteristic line II or III in FIG. 2.

With the line I in FIG. 2, the characteristic of the DC motor 10 is indicated by the line II. The improvement factor G of the motor constant speed characteristic becomes, as follows.

$$G \equiv \frac{b}{a} = 20 \log \frac{1}{1 - \frac{R1R2}{RoR3}} \ (dB) \quad (2)$$

Where a and b respectively indicate the rotational speed differences between the line III and the lines II and I.

Figure 3:
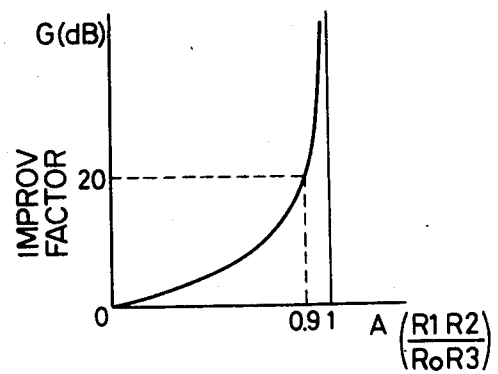
FIG. 3 is a graph indicating a characteristic of an improvement factor of the constant speed characteristic of the DC motor.

When R1R2/RoR3 is expressed by A, the relationship between this A and the improvement factor G becomes as indicated in FIG. 3. If A = 1, that is, in the characteristic indicated by the line III in FIG. 2, G is equal to infinity. Then, for A=0.9, G=20(dB); and for A=0.99, G=40(dB).

Therefore, in the circuit comprising the resistors R1, R2 and R3 and the differential amplifier 11, the rotational speed of the DC motor is detected by the counter electromotive force. The voltage drop across the armature resistance, due to the armature current, is compensated for and this counter electromotive force becomes constant. Thus, the rotational speed of the motor 10 is continually and automatically controlled and maintained at a constant value.

However, while the rotational speed of the motor is thus controlled by only the above described circuit, the rotational phase is not controlled. Accordingly, in the system of the present invention, a means is provided for detecting the rotational phase and applying the resulting detection signal to the terminal 17 of the above described circuit.

A rotary structure 12, having a permanent magnet is driven by the DC motor 10, either directly or through a power transmission means such as an endless belt. A magnetic head 13 cooperates with this permanent magnet to detect each rotation of the rotary structure 12. It will be apparent that this rotation detection means need not be limited to a combination of a magnetic head and a permanent magnet, but may be any other suitable rotation detection means known in the art.

A detection signal is thus produced by the magnetic head 13 in response to the rotation of the structure 12 and is fed by way of an amplifier 14 to a phase comparator 15, which compares the phase of this detection signal with a signal from a reference signal generator 16. The resulting output signal of the phase comparator 15 is applied to terminal 17.

In the preceding circuit description, the voltage applied to the terminal 17 was considered to be constant. In the actual practice of the invention, however, a signal responsive to the rotational phase of the rotary structure 12 is applied to the terminal 17. Thus, the DC motor 10 is so controlled that its rotational speed is constant and, moreover, the rotational phase of the rotary structure 12 is constant.

The embodiment of the invention shown in FIG. 4 is applied to a so-called head servo for controlling the rotation of rotary heads in a video signal recording and/or reproducing apparatus. The apparatus has a guide drum 30 with a magnetic tape wrapped in a helical path over a specific angular extent, around the guide drum. This guide drum 30 comprises an upper rotating drum 31, video heads 32a and 32b on the rotating drum 31 for recording and/or reproducing video signals, and a lower stationary drum 33. The DC motor 10 drives the rotating drum 31 at a constant rotational speed, via a small diameter pulley 34, an endless belt 35, and a large diameter pulley 36.

On its lower surface and at diametrically opposite positions the rotating drum 31 has permanent magnets 37a and 37b. A pickup head 38 is fixed at a position confronting the orbital path of the permanent magnets 37a and 37b and operates cooperatively with the permanent magnets 37a and 37b to generate alternately detection signals opposite polarity in accordance with the rotation of the drum 31. These detection signals from the pickup head 38 trigger the monostable multivibrators 39 and 40 alternately. These monostable multivibrators 39 and 40 are thus triggered to produce output signals once per revolution of the drum 31. These signals trigger a flip-flop 41. As a result, the flip-flop 41 produces a rectangular output wave of one cyclic period per revolution of the rotating drum 31. This output rectangular wave is formed into an inclined trapezoidal wave by a trapezoidal wave forming circuit 42 and is then supplied to a sampling circuit 43.

On the other hand, at the time of recording, a video signal is applied through a terminal 44 to a vertical synchronizing signal separation circuit 45, where a vertical synchronizing signal is separated from the input video signal. The monostable multivibrator 46 divides the frequency of this vertical synchronizing signal by one half. The frequency divided signal is recorded, on the one hand, as a control signal on an edge of the magnetic tape by a control head 47 and, on the other hand, is supplied by way of an amplifier 48 to trigger a monostable multivibrator 49. This monostable multivibrator produces narrow output pulses, which are fed to the sampling circuit 43, where they are used to sample the trapezoidal wave from the trapezoidal wave forming circuit 42.

At the time of reproduction, the control signal is reproduced by the control head 47 and is supplied by way of the amplifier 48 to the monostable multivibrator 49. The resulting output pulses of the monostable multivibrator 49 are used for sampling in the sampling circuit 43 as in the recording mode.

In the sampling circuit 43, the phases of the rotational phase detection signal of the rotating drum 31 are compared with the recording or reproducing control signal used as a reference signal. As a result, the sampling circuit 43 produces a low voltage sampling output when the rotational phase of the drum 31 is advanced relative to the phase of the reference signal. A high voltage output appears when the rotational phase is retarded relative to the phase of the reference signal. This sampling output is fed to a rotation control circuit 50 of the DC motor 10.

One embodiment of a specific circuit of the rotation control circuit 50 is shown in FIG. 5. Those parts which are the same as corresponding parts in FIG. 1 are designated by like reference numerals and characters. In this circuit, the output terminal of an operational amplifier 51 is connected to the base of a transistor 52, for current amplification. The collector of transistor 52 is connected to a power supply terminal 53, and the emitter is connected through a junction point 54 to resistors R1 and R3. The armature resistance Ro of the DC motor 10 and the resistors R1, R2, and R3 constitute a bridge circuit similar to the circuit shown in FIG. 1. The resistor R3 comprises a fixed resistor R3a and a fine-adjustment resistor Rr3b. The output signal of the sampling circuit 43 is applied to the terminal 17. When the variable resistor R3b is adjusted so that $$R1 \times R2 = R3 \times Ro \quad (3)$$

the voltages of the differential amplifier 11 and the terminal 53 become constant when the voltages at the junction points 18 and 19 are the same.

When the control voltage $E_c$ applied to the terminal 17 becomes low, the voltage at the junction point 19 becomes lower than that at the junction point 18. The voltage at the junction point 54 decreases from the above mentioned constant voltage toward zero. When the voltage at the terminal 17 becomes high, the voltage at the junction 19 becomes higher than that at the junction 18. The voltage at the junction 54 increases from the constant voltage toward the power supply voltage in accordance with the difference between the voltages at the junctions 19 and 18. As a result, the voltage $E_c$ and the counter electromotive force Eo of the DC motor 10 are continually the same.

Since the counter electromotive force Eo is proportional to the rotational speed of the DC motor 10, the DC motor rotates at a speed determined by the output voltage $E_c$ of the sampling circuit 43. Also, voltage $E_c$ is a low voltage when the rotating drum 31 is in a phase which is advanced relative to the reference phase. Voltage $E_c$ is high when the drum 31 is rotating with a phase which is retarded relative to the reference phase. For this reason, the rotation of the DC motor 10 is so controlled that the rotational phase of the rotating drum 31 is continually equal to the reference phase.

Figure 6:
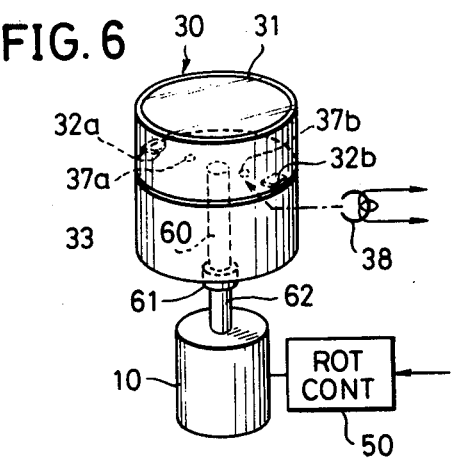
FIG. 6 is a diagrammatic perspective view showing a modification of one part of the system illustrated in FIG. 4.

In the above described embodiment of the invention, the drum 31 is rotated by power transmitted from the DC motor through a power transmission mechanism including the endless belt 35. However, as illustrated by the modification in FIG. 6, the rotating drum 31 may be coupled directly to and thus driven by the DC motor 10. In this case, the rotating shaft 60 of the rotating drum 31 is coupled directly to the rotor shaft 62 of the DC motor 10 by a coupling 61. The permanent magnets 37a and 37b may be mounted on either the rotating shaft 60 or the rotor shaft 62.

Figure 7:
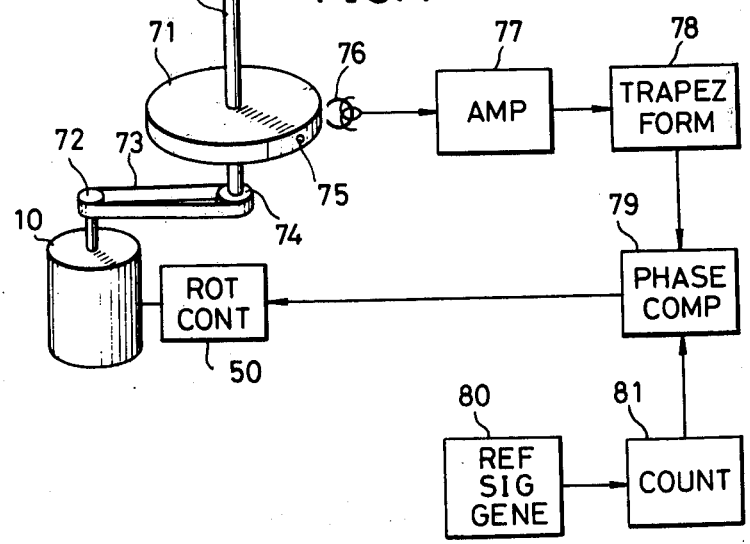
FIG. 7 is a block diagram of a DC motor rotation control system, constituting another embodiment of the invention.

FIG. 7 shows an embodiment wherein a capstan servo controls the rotation. The capstan 70 has a flywheel 71 driven by the DC motor 10 through a pulley 72, an endless belt 73, and a pulley 74. A permanent magnet 75 is a peripheral part of the flywheel 71, and a pickup head 76 confronts the permanent magnet 75.

The pickup head 76 produces, in accordance with the rotation of the capstan 70, an output signal having one pulse per revolution of the capstan 70. This output signal is supplied by way of an amplifier 77 to a trapezoidal wave forming circuit 78. The resulting output trapezoidal wave is fed to a phase comparator 79. On the other hand, a reference signal from generator 80 is counted down by a counter 81 so that its period becomes equal to the rotational period of the capstan 70. The resulting output signal of the counter 81 is fed to the phase comparator 79, where its phase is compared with that of the trapezoidal wave.

The phase comparator 79 thus produces a phase error output signal of a voltage lower than the reference voltage when the rotational phase of the capstan 70 is advanced relative to that of the reference signal. The output voltage is higher than the reference voltage when the rotational phase of the capstan 70 is retarded relative to the phase of the reference signal. This output of the phase comparator 79 is applied to the terminal 17 of the rotation control circuit 50. The DC motor 10 is thereby controlled so that its speed is constant and, moreover, the rotational phase of the capstan 70 becomes constant.

In accordance with the system of the present invention, the rotational speed of a DC motor is detected by an electronic current utilizing the counter electromotive force. The circuit compensates for the voltage drop across the armature resistance, due to the armature current, so that the counter electromotive force becomes constant. Accordingly, the speed of the motor is automatically controlled so that it becomes constant. Consequently, fluctuations of short duration in the rotational speed such as wow and flutter are eliminated by the electronic circuit. Accordingly, the phase control may operate so that the deviation of the rotational speed over a long period becomes zero. For this reason, a rotational phase detection of the rotary structure driven by the motor in the order of one or two cycles per revolution of the rotary structure is sufficient. There is no necessity for carrying out high-density and high-precision phase detection. Therefore, the control system as whole can be made very inexpensive.

Further, this invention is not limited to these embodiments. Variations and modifications may be made without departing from the scope and spirit of the invention.

What we claim is:

1. A system for controlling the rotation speed and phase of a direct current motor comprising:
    a direct current motor having an armature resistance;
    a rotary structure means driven by said motor;
    a differential operational amplifier having two input terminals, one of said input terminals being connected to said direct current motor;
    a first resistor connected between an output terminal of said amplifier and said one input terminal;
    a second resistor connected between the other input terminal of the amplifier and a terminal for applying a control signal voltage thereto;
    a third resistor connected between said output terminal of the amplifier and the other input terminal, said armature resistance and said first, second, and third resistors being connected as essentially a bridge circuit;
    means for detecting the rotational phase of said rotary structure and producing a phase detection output signal;
    means for supplying a reference signal; and
    phase comparing means for comparing said phase detection signal and said reference signal and applying the resulting output phase comparison error signal to said control signal voltage terminal.

2. A system for controlling the rotation of a direct current motor as claimed in claim 1 in which the resistance value Ro of said armature resistance, the resistance value R1 of said first resistor, the resistance value R2 of said second resistor, and the resistance value R3 of said third resistor are mutually related according to the equation $R1 \times R2 \times R3 \times Ro$.

3. A system for controlling the rotation of a direct current motor as claimed in claim 1 which further comprises a transistor having a base connected to said output terminal of the operational amplifier, a collector connected to a power source voltage terminal, and an emitter connected to said first and third resistors.

4. A system for controlling the rotation of a direct current motor as claimed in claim 1 in which said one of the input terminals of the operational amplifier is an inverting input terminal, and said other input terminal is a noninverting input terminal.

5. A system for controlling the rotation of a direct current motor as claimed in claim 1 in which said rotary structure is driven by power transmitted thereto from the direct current motor, rotating head means for recording or reproducing a video signal, and said reference signal supplying means supplies a synchronizing signal separated from said video signal or a signal obtained by recording and reproducing said synchronizing signal.

6. A system for controlling the rotation of a direct current motor as claimed in claim 5 in which said rotating head means is coupled directly to and driven by a rotor shaft of said direct current motor.

7. A system for controlling the rotation of a direct current motor as claimed in claim 5 which further comprises means for forming a trapezoidal wave from said output phase detection signal, and in which said phase comparing means comprises a circuit for sampling said trapezoidal wave responsive to said reference signal.

8. A system for controlling the rotation of a direct current motor as claimed in claim 1 in which said rotary structure is a capstan driven by power transmitted thereto from said direct current motor, and said reference signal supplying means comprises a reference signal generator, and means for frequency dividing the output signal of said reference signal generator so that the period thereof becomes equal to the rotational period of said capstan.

* * * * *

UNITED STATES PATENT AND TRADEMARK OFFICE
CERTIFICATE OF CORRECTION

PATENT NO. : 4,145,642
DATED : March 20, 1979
INVENTOR(S) : Yoshiteru Kosaka et al.

It is certified that error appears in the above-identified patent and that said Letters Patent are hereby corrected as shown below:

Column 6, line 62, claim 2 (last line) - "R1 x R2 x R3 x Ro"

should read -- R1 x R2 = R3 x Ro --.

Signed and Sealed this

Eighteenth Day of September 1979

[SEAL]

Attest:

LUTRELLE F. PARKER
*Attesting Officer*   *Acting Commissioner of Patents and Trademarks*